(12) United States Patent
Park

(10) Patent No.: US 9,754,301 B2
(45) Date of Patent: Sep. 5, 2017

(54) SYSTEM AND METHOD FOR MONITORING GAS STATION

(71) Applicant: Hyundai Motor Company, Seoul (KR)

(72) Inventor: Sang Woo Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 815 days.

(21) Appl. No.: 14/096,600

(22) Filed: Dec. 4, 2013

(65) Prior Publication Data

US 2014/0379523 A1 Dec. 25, 2014

(30) Foreign Application Priority Data

Jun. 24, 2013 (KR) ........................ 10-2013-0072276

(51) Int. Cl.
*G06Q 30/00* (2012.01)
*G06Q 30/06* (2012.01)
*G07C 5/00* (2006.01)

(52) U.S. Cl.
CPC ......... *G06Q 30/0609* (2013.01); *G07C 5/008* (2013.01)

(58) Field of Classification Search
CPC .............. G06Q 30/00; G06Q 30/0601; G06Q 30/0607; G06Q 30/0609
See application file for complete search history.

(56) References Cited

U.S. PATENT DOCUMENTS

| | | | | |
|---|---|---|---|---|
| 6,408,232 B1* | 6/2002 | Cannon | ................. | G08G 1/017 123/493 |
| 6,526,335 B1* | 2/2003 | Treyz | .................... | G01C 21/26 307/10.1 |
| 2006/0129283 A1* | 6/2006 | Alewine | ................. | G07C 5/008 701/1 |
| 2008/0133386 A1* | 6/2008 | Darvish | ............... | G06Q 20/102 705/30 |
| 2011/0187865 A1* | 8/2011 | Felt | .......................... | H04N 7/18 348/159 |
| 2012/0278479 A1* | 11/2012 | Miller | ................. | H04L 12/4633 709/224 |

(Continued)

FOREIGN PATENT DOCUMENTS

| | | |
|---|---|---|
| KR | 20-0281560 Y1 | 7/2002 |
| KR | 20-0388795 Y1 | 7/2005 |

(Continued)

*Primary Examiner* — Michael Misiaszek
*Assistant Examiner* — Christopher Seibert
(74) *Attorney, Agent, or Firm* — Mintz Levin Cohn Ferris Glovsky and Popeo, P.C.; Peter F. Corless

(57) ABSTRACT

A system and method for monitoring a gas station can be used to prevent deceptive practices, such as a gas station that deceives a refueling amount or supplies inferior fuel. The gas station monitoring system includes: at least one telematics terminal that collects refueling information and transmits the refueling information to the outside; a credit card company server that transmits payment information of a gas station to the outside; a traffic information providing server that transmits traffic information including a position of the gas station to the outside; and a telematics server that determines the gas station to be a dishonest gas station that deceives a refueling amount by comparing information that is transmitted from the at least one telematics terminal and the payment information.

11 Claims, 6 Drawing Sheets

(56) References Cited

U.S. PATENT DOCUMENTS

| | | | | |
|---|---|---|---|---|
| 2014/0379523 A1* | 12/2014 | Park | ................... | G06Q 30/0609 |
| | | | | 705/26.35 |
| 2016/0035001 A1* | 2/2016 | Driscoll | ............. | G06Q 30/0631 |
| | | | | 705/26.7 |
| 2016/0127872 A1* | 5/2016 | Oren | .................... | H04W 12/08 |
| | | | | 705/21 |

FOREIGN PATENT DOCUMENTS

| KR | 10-2007-0111011 A | 11/2007 |
|---|---|---|
| KR | 10-2009-0000037 A | 1/2009 |
| KR | 10-2012-0017122 A | 2/2012 |
| KR | 10-2013-0005663 A | 1/2013 |

\* cited by examiner

SYSTEM AND METHOD FOR MONITORING GAS STATION

CROSS-REFERENCE TO RELATED APPLICATION

This application claims under 35 U.S.C. §119(a) priority to and the benefit of Korean Patent Application No. 10-2013-0072276 filed in the Korean Intellectual Property Office on Jun. 24, 2013, the entire contents of which are incorporated herein by reference.

BACKGROUND (a) Field of the Invention

The present invention relates to a system and method for monitoring a gas station, in which it is possible to determine if a gas station deceives a refueling amount or supplies inferior fuel using a telematics terminal.

(b) Description of the Related Art

As gas prices generally continue to climb worldwide, there have been instances in which gas stations deceive the buyer based on a refueling amount or through the sale of inferior fuel.

For example, according to a recent survey in Korea, it was determined that in 2011-2012, based on a review of 88.5% of gas stations in the country, lubricators refueled an average of 43.97 mL less than a displayed amount of 20 L. In such gas stations, it has been found that the software of a lubricator has been unlawfully manipulated, as an example of refueling and exposing fuel less than the displayed amount.

Inferior fuel is formed by mixing a petrochemical product such as solvent and toluene to normal fuel, and when using inferior fuel, an engine may be seriously damaged and fuel consumption may be deteriorated. Further, when using inferior fuel, there is a problem of life-span reduction of major parts of a vehicle and generation of a poisonous exhaust gas according to incomplete combustion.

In this way, consumers are negatively impacted, but it is difficult for the consumer to determine refueling of a fixed quantity and normal fuel.

Therefore, it would be desirable to provide a method of determining whether a gas station dishonestly refuels or supplies inferior fuel.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a system and method for monitoring a gas station having advantages of determining whether a gas station deceives a refueling amount or supplies inferior fuel using a telematics terminal.

An exemplary embodiment of the present invention provides a gas station monitoring system including: at least one telematics terminal that collects refueling information and that transmits the refueling information to the outside; a credit card company server that transmits payment information of a gas station to the outside; a traffic information providing server that transmits traffic information including a position of the gas station to the outside; and a telematics server that determines the gas station to be a dishonest gas station that deceives a refueling amount by comparing information that is transmitted from the at least one telematics terminal and the payment information.

The refueling information may include a refueling date and time, a refueling position, and a measured refueling amount, and the payment information may include a payment date and time, a gas station position, and a payment refueling amount.

The telematics server may increase a dishonest number of times of the gas station, if the refueling date and time correspond with the payment date and time, if the refueling position corresponds with the gas station position, and if the measured refueling amount is less than the payment refueling amount.

The telematics server may determine the gas station to be a dishonest gas station, if the dishonest number of times of the gas station is greater than a predetermined number of times.

Another embodiment of the present invention provides a gas station monitoring system including: at least one telematics terminal that collects vehicle information, refueling information, and a diagnostic code and that transmits the vehicle information, the refueling information, and the diagnostic code to the outside; a traffic information providing server that transmits traffic information including a position of a gas station to the outside; and a telematics server that receives the vehicle information, the refueling information, the diagnostic code, and the traffic information and that calculates and stores a driver's driving pattern based on the vehicle information and that updates an average fuel consumption table of each gas station based on the driving pattern and the traffic information and that determines a gas station that sells inferior fuel based on the average fuel consumption table, a diagnostic code occurrence history, and a refueling history.

The vehicle information may include driver personal information, driving distance information, driving time information, vehicle speed information, acceleration/deceleration information, position information, gearshift information, load information, and vehicle model information, the refueling information may include a refueling date and time, a refueling position, and a measured refueling amount, and the traffic information may include road slope information, road curvature information, and traffic situation information.

The telematics server may calculate a driver's driving pattern based on the vehicle information and classify average fuel consumption of vehicles of each gas station on a class basis based on the driving pattern and the traffic information.

The telematics server may determine the gas station to be a gas station that sells inferior fuel, if a case in which fuel consumption of vehicles corresponding to the same class is less than the average fuel consumption occurs a first reference or more, after refueling at the gas station.

The telematics server may determine the gas station to be a gas station that sells inferior fuel, if a case in which diagnostic codes of vehicles corresponding to the same class are the same occurs a second reference or more, after refueling at the gas station.

Yet another embodiment of the present invention provides a method of monitoring a gas station including: collecting refueling information including vehicle information, a refueling date and time, a refueling position, and a measured refueling amount; collecting payment information including a payment date and time, a gas station position, and a payment refueling amount; increasing, if the refueling date and time correspond with the payment date and time, and if the refueling position corresponds with the gas station position, and if the measured refueling amount is less than the payment refueling amount, the dishonest number of times of the gas station; and determining, if the dishonest number of times of the gas station is greater than a predetermined number of times, the gas station to be a dishonest gas station.

Yet another embodiment of the present invention provides a method of monitoring a gas station including: receiving vehicle information, refueling information, and a diagnostic code; receiving traffic information including a position of a gas station; calculating and storing a driver's driving pattern based on the traffic information; updating an average fuel consumption table of each gas station based on the driving pattern and the traffic information; and determining a gas station that sells inferior fuel based on the average fuel consumption table, a diagnostic code occurrence history, and a refueling history.

The vehicle information may include driver personal information, driving distance information, driving time information, vehicle speed information, acceleration/deceleration information, position information, gearshift information, load information, and vehicle model information, the refueling information may include a refueling date and time, a refueling position, and a measured refueling amount, and the traffic information may include road slope information, road curvature information, and traffic situation information.

The determining of a gas station that sells inferior fuel may include determining the gas station to be a gas station that sells inferior fuel, if a case in which fuel consumption of vehicles corresponding to the same class is less than predetermined average fuel consumption occurs a first reference or more, after refueling at the gas station.

The determining of a gas station that sells inferior fuel may include determining the gas station to be a gas station that sells inferior fuel, if a case in which diagnostic codes of vehicles corresponding to the same class are the same occurs a second reference or more, after refueling at the gas station.

DETAILED DESCRIPTION OF THE EMBODIMENTS

Figure 1:
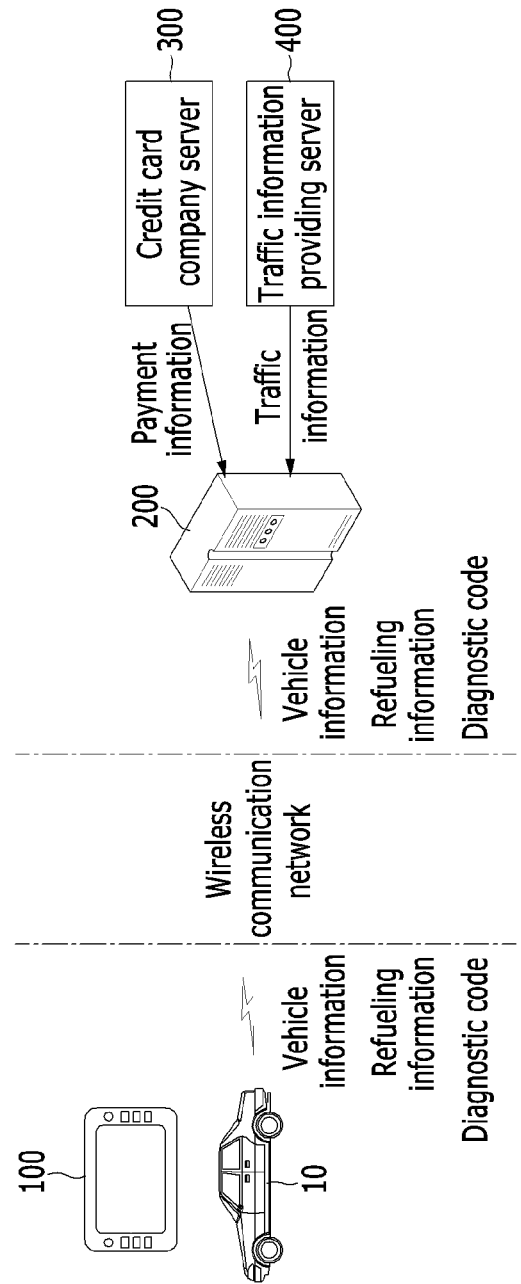
FIG. 1 is a diagram illustrating a configuration of a gas station monitoring system according to an exemplary embodiment of the present invention.

The present invention will be described more fully hereinafter with reference to the accompanying drawings, in which exemplary embodiments of the invention are shown. However, the present invention is not limited to an exemplary embodiment described here but may be exemplified in other forms.

The drawings and description are to be regarded as illustrative in nature and not restrictive. Like reference numerals designate like elements throughout the specification.

Further, in the drawings, a size and thickness of each element are randomly represented for better understanding and ease of description, and the present invention is not limited thereto.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

FIG. 1 is a diagram illustrating a configuration of a gas station monitoring system according to an exemplary embodiment of the present invention.

Referring to FIG. 1, the gas station monitoring system according to an exemplary embodiment of the present invention includes a telematics terminal 100, a telematics server 200, a credit card company server 300, and a traffic information providing server 400 that are provided in a vehicle 10.

Hereinafter, for convenience of description, it is assumed that the telematics terminal 100 is provided in each of a plurality of vehicles 10.

The telematics terminal 100 collects vehicle information, refueling information, and a diagnostic code and transmits the vehicle information, the refueling information, and the diagnostic code to the telematics server 200 through a wireless communication network.

The vehicle information may include driver personal information, driving distance information, driving time information, vehicle speed information, acceleration/deceleration information, position information, gearshift information, load information, and vehicle model information.

The driver personal information may include information for user authentication.

The driving distance information may include information about a driving distance of a vehicle after starting and a driving distance on a period basis (e.g., daily, weekly, or monthly). The driving time information may include information about a driving distance of a vehicle after starting and a driving time on a periodic basis (e.g., daily, weekly, or monthly).

The position information may include information about a present position of the vehicle. The load information may include information about use of an air conditioning device and a lamp that are installed in a vehicle, or any other vehicle components that may have an influence on fuel consumption.

The vehicle model information may include information about a model and a production date of a vehicle.

The refueling information may include a refueling date and time, a refueling position, and a measured refueling amount. When fuel is injected into the vehicle 10, a present position of the vehicle 10 becomes the refueling position. The measured refueling amount is measured by the refueling detection sensor 50 that is provided in the vehicle 10.

In order to determine whether a particular gas station is a dishonest gas station that deceives the refueling amount, the telematics server 200 is operably connected with the credit card company server 300 through a wired or wireless communication network to receive payment information.

The payment information may include a payment date and time, a gas station position, and a payment refueling amount. The payment refueling amount is a refueling amount of fuel in which a card user purchases.

In order to calculate a driving pattern, the telematics server 200 is operably connected with the traffic information providing server 400 through a wired or wireless communication network to receive traffic information.

The traffic information includes information about a position of a gas station. Further, the traffic information may include road slope information, road curvature information, and traffic situation information. The traffic situation information may include information about a communication congestion situation due to a traffic amount or a traffic accident on a downtown road, a suburban road, or an express highway, for example.

The telematics server 200 stores information that is received from the telematics terminal 100, the credit card company server 300, and the traffic information providing server 400 and thereby is able to determine a gas station that deceives a refueling amount or that supplies inferior fuel based on the stored information.

The telematics terminal 100 and the telematics server 200 according to an exemplary embodiment of the present invention will be described in detail with reference to FIGS. 2 and 3.

Figure 2:
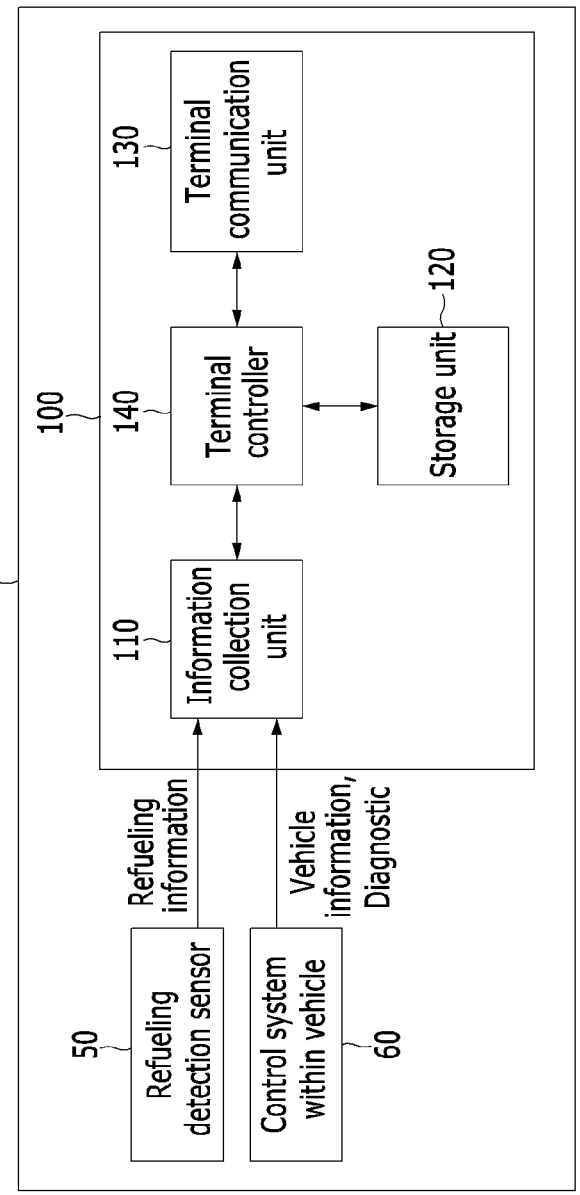
FIG. 2 is a block diagram illustrating a telematics terminal according to an exemplary embodiment of the present invention.

FIG. 2 is a block diagram illustrating a telematics terminal according to an exemplary embodiment of the present invention.

Referring to FIG. 2, the telematics terminal 100 according to an exemplary embodiment of the present invention includes an information collection unit 110, a terminal communication unit 130, and a terminal controller 140. Further, the telematics terminal 100 may further include a storage unit 120 that stores information that is collected at the information collection unit 110.

The information collection unit 110 collects refueling information from a refueling detection sensor 50 that is provided at the inside of a vehicle. Further, the information collection unit 110 collects vehicle information and a diagnostic code from a control system 60 within the vehicle.

Particularly, information that is acquired through the refueling detection sensor 50 that is provided within the vehicle and the control system 60 within the vehicle is transferred through a communication control system within the vehicle. Such a communication control system within the vehicle may use CAN communication of a high speed.

The collected information is transferred to the storage unit 120 and is stored and classified at the storage unit 120.

Information that is collected at the information collection unit 110 is transferred to the terminal controller 140. Further, among information that is stored at the storage unit 120, necessary information is extracted and is transferred to the terminal controller 140.

The terminal communication unit 130 transmits the collected information to the telematics server 200 through a wireless communication network.

The terminal controller 140 may be embodied with at least one microprocessor operating by a predetermined program, and such a predetermined program includes a series of commands to perform each step that is included in a method of monitoring a gas station of an exemplary embodiment of the present invention to be described later. The terminal controller 140 controls general operations of the telematics terminal 100.

Figure 3:
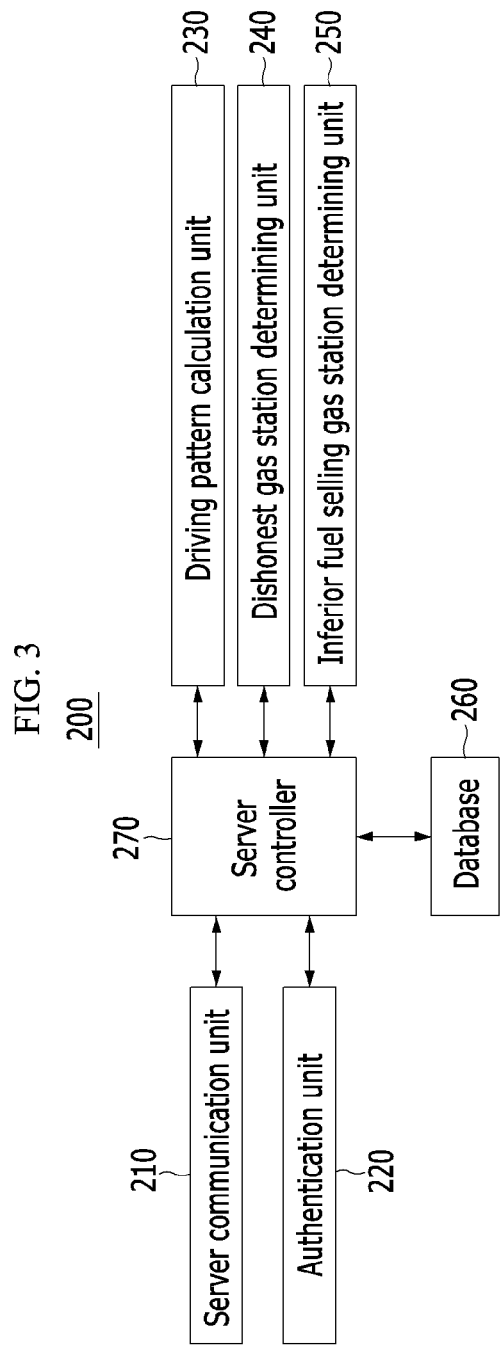
FIG. 3 is a block diagram illustrating a telematics server according to an exemplary embodiment of the present invention.

FIG. 3 is a block diagram illustrating a telematics server according to an exemplary embodiment of the present invention.

Referring to FIG. 3, the telematics server 200 according to an exemplary embodiment of the present invention includes a server communication unit 210, an authentication unit 220, a driving pattern calculation unit 230, a dishonest gas station determining unit 240, an inferior fuel selling gas station determining unit 250, a database 260, and a server controller 270.

The server communication unit 210 receives vehicle information and refueling information from the telematics terminal 100. Further, the server communication unit 210 receives payment information from the credit card company server 300 and receives traffic information from the traffic information providing server 400. The received information is stored and classified in the database 260. In particular, as information that is received from a plurality of telematics terminals 100 increases, information that is accumulated in the database 260 increases.

The authentication unit 220 performs a driver authentication operation to correspond to an authentication request of the telematics terminal 100. The authentication unit 220 compares previously registered driver authentication information and received driver personal information and performs an authentication procedure.

The driving pattern calculation unit 230 calculates a driver's driving pattern based on information that is accumulated in the database 260. The driver's driving pattern is calculated through statistical analysis using driving distance information, driving time information, vehicle speed information, and acceleration/deceleration information that is accumulated in the database 260. The calculated driver's driving pattern is stored in the database 260.

The dishonest gas station determining unit 240 determines a dishonest gas station that deceives a refueling amount by comparing refueling information and payment information that is stored in the database 260.

Specifically, a method of determining a dishonest gas station will be described with reference to FIG. 4.

The inferior fuel selling gas station determining unit 250 updates an average fuel consumption table of each gas station based on a driving pattern and traffic information that is stored in the database 260. The average fuel consumption table of the each gas station is stored in the database 260.

The inferior fuel selling gas station determining unit 250 determines a gas station that sells inferior fuel based on an average fuel consumption table, a diagnostic code occurrence history, and a refueling history that are stored in the database 260.

Specifically, a method of determining an inferior fuel selling gas station will be described later with reference to FIGS. 5 and 6.

In the database 260, vehicle information, refueling information, and a diagnostic code that are received from the telematics terminal 100 are stored. Further, the calculated driver's driving pattern and an average fuel consumption table of each gas station are stored.

The server controller 270 may be embodied with at least one microprocessor operating a predetermined program, and such a predetermined program includes a series of commands to perform each step that is included in a method of monitoring a gas station of an exemplary embodiment of the present invention to be described later. In particular, the predetermined program is embodied in a non-transitory computer readable medium. The server controller 270 controls operation of the telematics server 200.

Further, in FIG. 3, the driving pattern calculation unit 230, the dishonest gas station determining unit 240, and the inferior fuel selling gas station determining unit 250 that are connected to the server controller 270 are illustrated, but the driving pattern calculation unit 230, the dishonest gas station determining unit 240, and the inferior fuel selling gas station determining unit 250 may be formed in a module in the server controller 270 to be included in the server controller 270.

Figure 4:
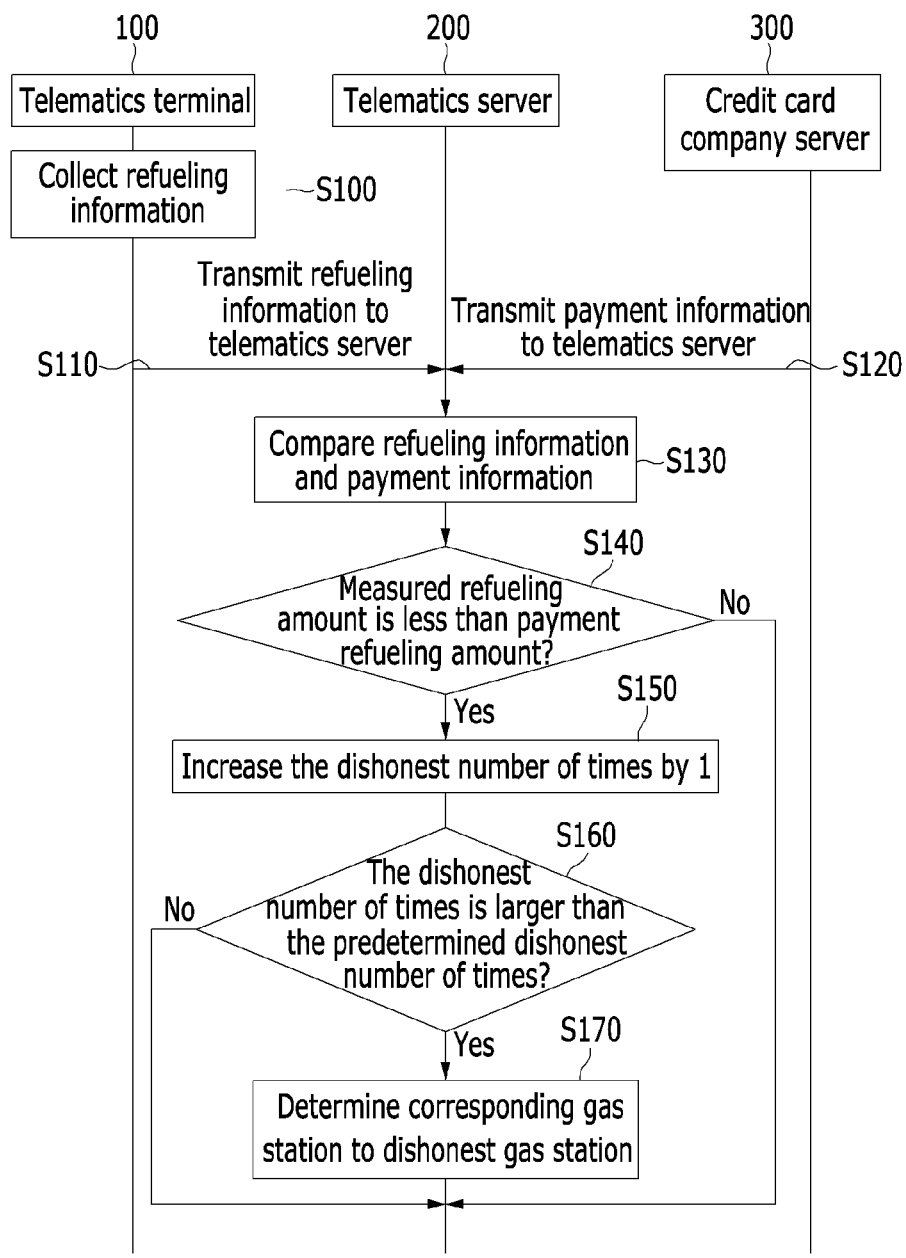
FIG. 4 is a flowchart illustrating a method of determining a dishonest gas station according to an exemplary embodiment of the present invention.

FIG. 4 is a flowchart illustrating a method of determining a dishonest gas station according to an exemplary embodiment of the present invention.

Referring to FIG. 4, the telematics terminal 100 collects refueling information (S100). The refueling information includes a refueling date and time, a refueling position, and a measured refueling amount.

The telematics terminal 100 transmits the refueling information to the telematics server 200 (S110).

The credit card company server 300 transmits payment information to the telematics server 200 (S120). The payment information includes a payment date and time, a gas station position, and a payment refueling amount.

The telematics server 200 compares the refueling information and the payment information (S130). If the refueling date and time correspond with the payment date and time, and if the refueling position corresponds with the gas station position, the telematics server 200 determines whether the measured refueling amount is less than the payment refueling amount (S140).

If the measured refueling amount is less than the payment refueling amount, the telematics server 200 increases the dishonest number of times of a corresponding gas station by 1 (S150), i.e., a counter is incremented each time a comparison shows that the measured refueling amount is less than the payment refueling amount. The payment refueling amount may be corrected in consideration of an error allowance range of a lubricator. The dishonest number of times is stored in the database 260 and is classified on a gas station basis.

The telematics server 200 determines whether the dishonest number of times is greater than a predetermined dishonest number of times (S160). If the dishonest number of times is greater than the predetermined dishonest number of times, the telematics server 200 determines a corresponding gas station to be a dishonest gas station (S170).

Figure 5:
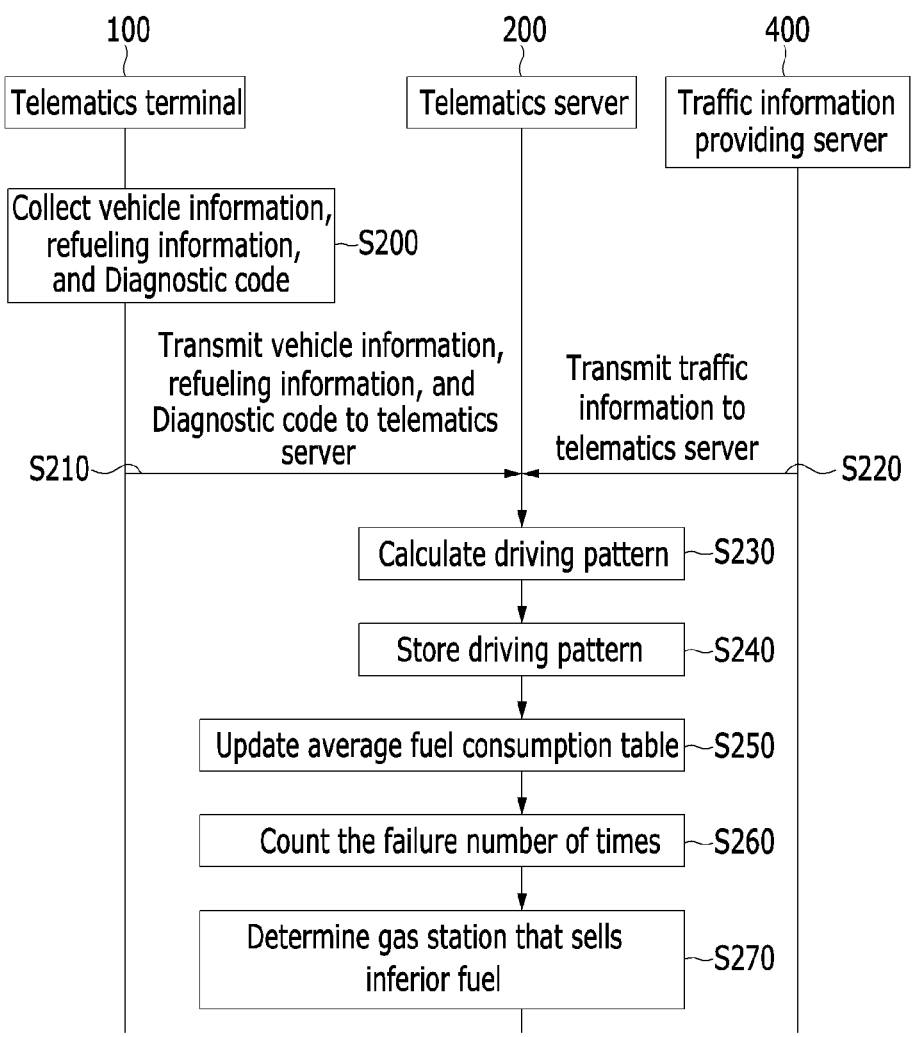
FIG. 5 is a flowchart illustrating a method of determining an inferior fuel selling gas station according to an exemplary embodiment of the present invention.

FIG. 5 is a flowchart illustrating a method of determining an inferior fuel selling gas station according to an exemplary embodiment of the present invention.

Figure 6:
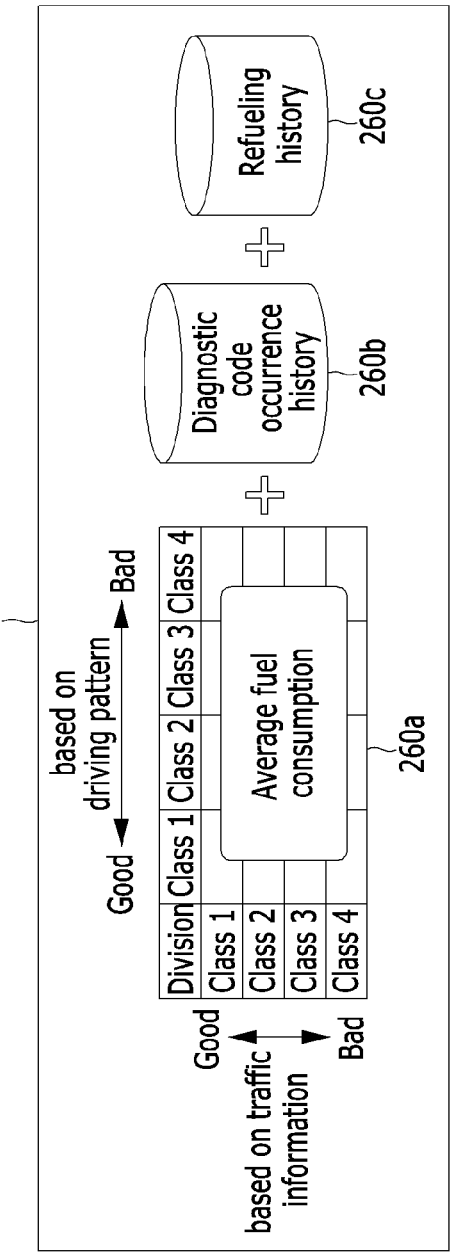
FIG. 6 is a diagram illustrating an average fuel consumption table, a diagnostic code occurrence history, and a refueling history that are stored at a database according to an exemplary embodiment of the present invention.

FIG. 6 is a diagram illustrating an average fuel consumption table, a diagnostic code occurrence history, and a refueling history that are stored at a database according to an exemplary embodiment of the present invention.

Referring to FIGS. 5 and 6, the telematics terminal 100 collects vehicle information, refueling information, and a diagnostic code (S200).

The telematics terminal 100 transmits the vehicle information, the refueling information, and the diagnostic code to the telematics server 200 (S210). The vehicle information may include driver personal information, driving distance information, driving time information, vehicle speed information, acceleration/deceleration information, position information, gearshift information, load information, and vehicle model information.

The traffic information providing server 400 transmits traffic information to the telematics server 200 (S220). The traffic information includes information about a gas station. Further, the traffic information may further include road slope information, road curvature information, and traffic situation information.

The telematics server 200 stores the collected information in the database 260.

The telematics server 200 calculates a driver's driving pattern based on vehicle information that is accumulated in the database 260 (S230). Further, when calculating the driving pattern, the traffic information may be considered.

The calculated driving pattern is stored in the database 260 (S240).

The telematics server 200 updates an average fuel consumption table 260a of each gas station based on the driving pattern and the traffic information (S250). The telematics server 200 classifies average fuel consumption of vehicles of each gas station on a class basis based on the driving pattern and the traffic information. In particular, in the database 260, the average fuel consumption table 260a, a diagnostic code occurrence history 260b, and a refueling history 260c of each gas station are stored.

An average fuel consumption table that is shown in FIG. 6 is an example of the present invention, and the present invention is not limited thereto.

The telematics server 200 classifies a vehicle corresponding to a similar driving pattern and traffic state into the same class.

The telematics server 200 compares fuel consumption of vehicles corresponding to the same class with average fuel consumption of a corresponding class and counts the failure number of times (S260).

Specifically, after a vehicle is refueled at a specific gas station, if fuel consumption of vehicles corresponding to the same class is less than the average fuel consumption, the telematics server 200 increases the failure number of times.

If the failure number of times is equal to or greater than a predetermined first reference, the telematics server 200 determines the gas station to be a gas station that sells inferior fuel (S270). The predetermined first reference may be set to a value in which a person of a common skill in the art preferably determines.

Further, after a vehicle is refueled at a specific gas station, if diagnostic codes of vehicles corresponding to the same class are the same, the telematics server 200 increases the failure number of times.

If the failure number of times is equal to or greater than a predetermined second reference, the telematics server 200 determines the gas station to be a gas station that sells inferior fuel (S270). The predetermined second reference may be set to a value that determines in which a person of a common skill in the art is preferable.

Thereby, according to an exemplary embodiment of the present invention, a dishonest gas station that deceives a refueling amount can be determined using the telematics terminal 100 and the credit card company server 300.

A driver's driving pattern can be calculated using the telematics terminal 100 and the traffic information providing server 400, and a gas station that supplies inferior fuel can be determined based on fuel consumption information.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A gas station monitoring system, comprising:
   at least one telematics terminal that collects vehicle information, refueling information, and a diagnostic code, and transmits the vehicle information, the refueling information, and the diagnostic code to the outside;
   a refueling detection sensor equipped in a vehicle that provides the refueling information to the at least one telematics terminal;
   a control system equipped in the vehicle that provides the vehicle information to the at least one telematics terminal;
   a traffic information providing server that transmits traffic information comprising a position of a gas station to the outside; and
   a telematics server that receives the vehicle information, the refueling information, the diagnostic code, and the traffic information, calculates and stores a driver's driving pattern based on the vehicle information, updates an average fuel consumption table of each gas station based on the driving pattern and the traffic information, and determines if the gas station sells inferior fuel based on the average fuel consumption table, a diagnostic code occurrence history, and a refueling history.

2. The gas station monitoring system of claim 1, wherein the vehicle information comprises driver personal information, driving distance information, driving time information, vehicle speed information, acceleration/deceleration information, position information, gearshift information, load information, and vehicle model information,
   the refueling information comprises a refueling date and time, a refueling position, and a measured refueling amount, and
   the traffic information comprises road slope information, road curvature information, and traffic situation information.

3. The gas station monitoring system of claim 2, wherein the telematics server calculates a driver's driving pattern based on the vehicle information and classifies average fuel consumption of vehicles of each gas station on a class basis based on the driving pattern and the traffic information.

4. The gas station monitoring system of claim 3, wherein the telematics server determines the gas station to be a gas station that sells inferior fuel, in a case in which fuel consumption of vehicles corresponding to the same class is less than the average fuel consumption occurs a first reference or more, after refueling at the gas station.

5. The gas station monitoring system of claim 3, wherein the telematics server determines the gas station to be a gas station that sells inferior fuel, in a case in which diagnostic codes of vehicles corresponding to the same class are the same occurs a second reference or more, after refueling at the gas station.

6. The gas station monitoring system of claim 3, wherein the telematics server determines the gas station to be a gas station that sells inferior fuel, in a case in which fuel consumption of vehicles corresponding to the same class is less than the average fuel consumption occurs a first reference or more, after refueling at the gas station, and in a case in which diagnostic codes of vehicles corresponding to the same class are the same occurs a second reference or more.

7. A method of monitoring a gas station, the method comprising:
   receiving vehicle information, refueling information, and a diagnostic code at one or mom telematics terminals, the refueling information provided to the one or more telematics terminals by a refueling detection sensor equipped in a vehicle, and the vehicle information provided to the one or more telematics terminals by a control system equipped in the vehicle;
   receiving traffic information comprising a position of a gas station at a telematics server, the traffic information transmitted by a traffic information providing server;
   calculating and storing, by the telematics server, a driver's driving pattern based on the traffic information;
   updating, by the telematics server, an average fuel consumption table of each gas station based on the driving pattern and the traffic information; and
   determining, by the telematics server, if the gas station sells inferior fuel based on the average fuel consumption table, a diagnostic code occurrence history, and a refueling history.

8. The method of claim 7, wherein
   the vehicle information comprises driver personal information, driving distance information, driving time information, vehicle speed information, acceleration/deceleration information, position information, gearshift information, load information, and vehicle model information,
   the refueling information comprises a refueling date and time, a refueling position, and a measured refueling amount, and
   the traffic information comprises road slope information, road curvature information, and traffic situation information.

9. The method of claim 8, wherein the step of determining if the gas station sells inferior fuel comprises determining the gas station to be a gas station that sells inferior fuel, in a case in which fuel consumption of vehicles corresponding to the same class is less than predetermined average fuel consumption occurs a first reference or more, after refueling at the gas station.

10. The method of claim 8, wherein the step of determining if the gas station sells inferior fuel comprises determining the gas station to be a gas station that sells inferior fuel, in a case in which diagnostic codes of vehicles corresponding to the same class are the same occurs a second reference or more, after refueling at the gas station.

11. The method of claim 8, wherein the step of determining if the gas station sells inferior fuel comprises determining the gas station to be a gas station that sells inferior fuel, in a case in which fuel consumption of vehicles corresponding to the same class is less than predetermined average fuel consumption occurs a first reference or more, and in a case in which diagnostic codes of vehicles corresponding to the same class are the same occurs a second reference or more, after refueling at the gas station.

\* \* \* \* \*